United States Patent [19]
Cudby

[11] 3,904,566
[45] Sept. 9, 1975

[54] JOINTING COMPOSITIONS

[75] Inventor: Joseph William Cudby, Sheffield, England

[73] Assignee: United States Steel Corporation, Pittsburgh, Pa.

[22] Filed: July 19, 1973

[21] Appl. No.: 380,808

[30] Foreign Application Priority Data
July 25, 1972 United Kingdom............ 34630/72
May 19, 1973 United Kingdom............ 24005/73

[52] U.S. Cl............. 260/23.7 M; 260/23.7 B; 260/33.6 AQ; 260/42.37; 260/754; 106/206; 106/209
[51] Int. Cl.².................. C09J 3/12; C08L 15/00
[58] Field of Search...... 260/765, 720, 719, 33.6 A, 260/33.6 AQ, 23.7 B, 23.7 M, 42.37, 754

[56] References Cited
UNITED STATES PATENTS

| | | | |
|---|---|---|---|
| 2,422,153 | 6/1947 | Nimwegen | 260/765 |
| 2,853,742 | 9/1958 | Dasher | 260/720 |
| 2,903,437 | 9/1959 | Van Epp | 260/33.6 A |
| 3,257,350 | 6/1966 | Maass | 260/33.6 AQ |
| 3,324,075 | 6/1967 | Burak | 260/765 |
| 3,553,125 | 1/1971 | Watters | 260/33.6 AQ |
| 3,637,556 | 1/1972 | Brillinger | 260/237 B |
| 3,714,107 | 1/1973 | Smith | 260/41.5 |

*Primary Examiner*—Theodore Morris
*Attorney, Agent, or Firm*—Walter P. Wood

[57] ABSTRACT

A putty-like jointing composition suitable for use in sealing joints in a sliding gate valve assembly used in the casting of steel comprises a liquid carrier, a plasticising binder and a refractory powder of fine particle size. The liquid carrier is either water or an organic liquid. Suitable plasticising binders include rubber based materials and cellulose gum, and if rubber based may also include an oil of lubricating viscosity. The powder is preferably alumina.

9 Claims, 1 Drawing Figure

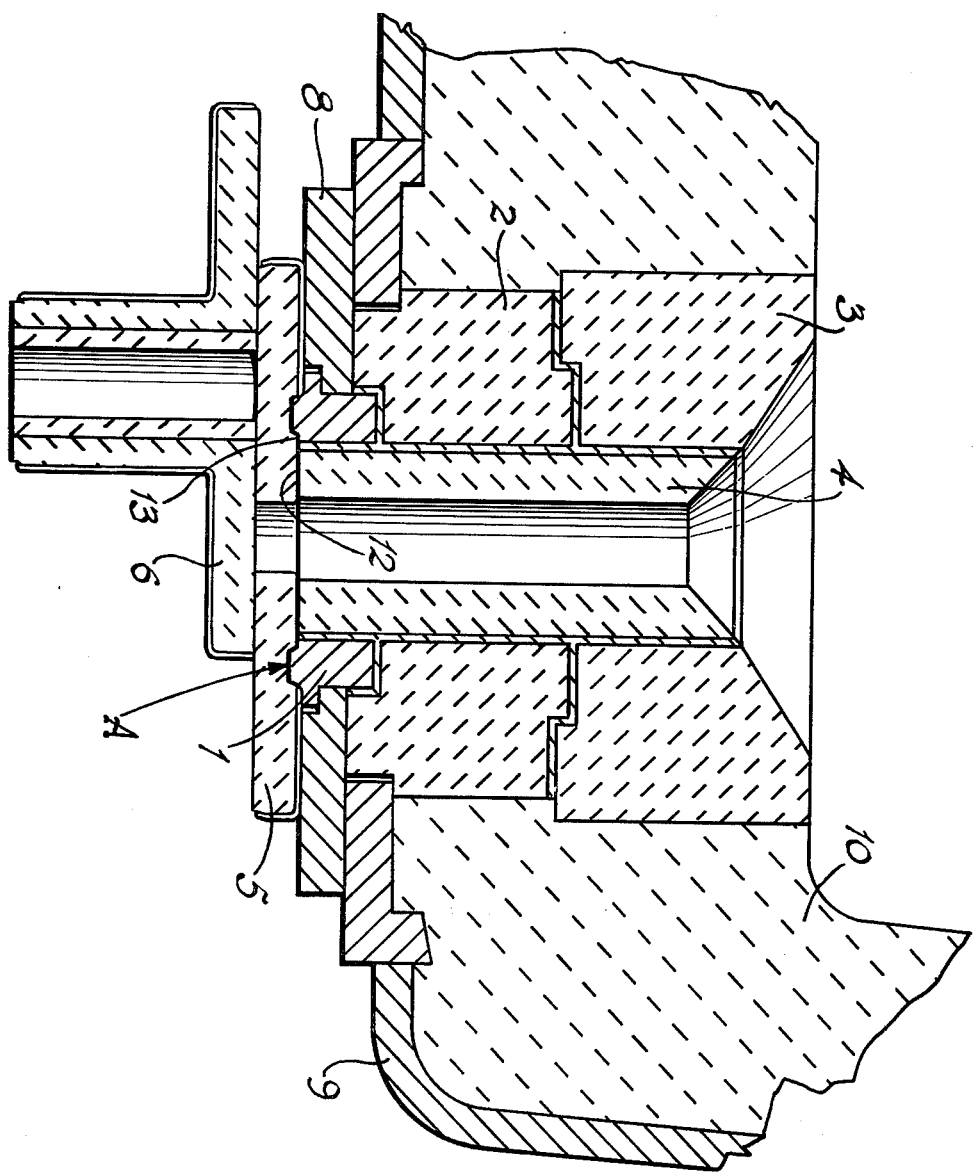

JOINTING COMPOSITIONS

This invention is concerned with improvements in or relating to jointing compositions particularly but not exclusively for use in sliding gate valve installations in the casting of steel. Examples of such sliding gate valve installations are described in U.K. Pat. specification No. 1,093,478 of United States Steel Corporation.

We have found that satisfactory refractory seals may be obtained by using a refractory jointing composition comprising a liquid carrier, a plasticising binder and a refractory powder of very fine particle size, e.g. finer than 100 mesh B.S.S. preferably finer than 300 mesh B.S.S., but in particular cases the composition may also comprise refractory powder of coarser particle size in part replacement of the very fine material.

It is an object of the present invention to provide an improved jointing composition.

The invention provides a refractory jointing composition comprising a liquid carrier, a plasticising binder anad a refractory powder of very fine particle size.

The invention also provides a putty-like jointing composition comprising 2 to 30% by weight of a liquid carrier, 0.1 to 35% of a plasticising binder, and 60 to 90% of a refractory powder of particle size finer than 100 mesh B.S.S., said composition being refractory with respect to molten metal.

The invention also comprehends a workpiece sealed by a composition according to the invention, a sliding gate valve assembly incorporating joints sealed by such a composition; and a method of sealing joints between refractory components using such a composition.

There now follows a description of examplary embodiments of the invention. This description which is illustrative of composition method and apparatus aspects of the invention, is given by way of example of the invention only and not by way of limitation thereof.

Compositions embodying the invention are putty-like in consistency and when used are refractory with respect to molten metal.

The liquid carrier is for example water or an aliphatic or aromatic organic liquid. Examples of organic liquids include hydrocarbons e.g. benzene, toluene, xylene, and solvent naphtha; white spirit; and carbon tetrachloride.

Examples of plasticising binders include mixtures of rubber and oil of a lubricating viscosity; natural or synthetic latex rubber; cellulose gum; aqueous emulsified polyvinyl acetate; polysaccharide gum; refined seaweed extract; sodium alginate. Examples of rubbers include depolymerised butyl rubber; depolymerised natural rubber; and silicone rubber.

It will be realised that all the components of the composition must be compatible and the appended claims are to be interpreted accordingly; for example, with the rubber/oil binder an organic liquid carrier is used, whereas with latex rubber the carrier is water, which may be wholly provided by the water of the latex itself.

Examples of refractory powders include for example fused alumina, sintered alumina, fused mullite, sintered mullite, calcined bauxite, sintered china/clay and raw kyanite. These materials may be used alone or mixed with additional particulate refractory fillers in the raw, calcined, sintered or fused condition, for example silica, magnesium silicates, magnesia, zircon, zirconia, chromic oxide, alumino silicates such as sillimanite, andalusite, china clay, ball clay, fire clay, graphite and other forms of carbon, and also synthetic spinels produced from combinations of the above.

Various refractory, glass and other fibres, including alumino silicates, may be incorporated with the refractory powders or fillers; small additions, e.g. from say 0.10 to 10% by weight tend to give increased strength and toughness by means of the inherent interlocking fibrous structure. Fibres up to 10 mm. long are preferred.

Where coarser refractory material is used in part replacement of the very fine material, this is for example in an amount not exceeding 50% by weight of the total refractory powder present in the composition; the particle size of the coarser material for example does not exceed 3 mm. The amount and particle size of the coarser material depends on the size of the joint to which the composition is to be applied.

With compositions comprising an organic liquid carrier, rubber and oil of a lubricating viscosity, the oil may for example include a vegetable oil as well as a mineral oil, e.g. raw, refined or boiled linseed oil or rapeseed oil.

Preferred ranges for the ingredients of the composition on a weight basis are as follows:

| | |
|---|---|
| Liquid carrier | 2 to 30% |
| Binder | 0.1 to 35% |
| Refractory powder | 60 to 90% |

When the composition comprises an organic liquid carrier more preferred ranges are as follows:

| | |
|---|---|
| Liquid carrier | 2 to 12% |
| Binder | 9 to 35% |
| Refractory powder | 60 to 90% (more preferably 70 to 90%). |

When the composition comprises an aqueous carrier more preferred ranges are as follows:

| | |
|---|---|
| Water | 5 to 30% |
| Binder | 0.1 to 20% |
| Refractory powder | 60 to 90% |

When the composition comprises a rubber, a mineral oil and linseed or other vegetable oil the preferred ranges of these ingredients by weight of the total composition are as follows:

| | |
|---|---|
| Rubber | 5 to 20% |
| Mineral oil | 3 to 10% |
| Vegetable oil | 1 to 5% |

When the composition comprises a rubber latex, the total liquid carrier being provided by the water of the latex, the preferred ranges by weight of the total composition are as follows:

| | |
|---|---|
| Rubber solids | 4 to 20% |
| Water | 5 to 25% |

When the composition comprises water and a cellulose gum, preferred ranges by weight of the total composition are as follows:

| | |
|---|---|
| Cellulose gum | 0.1 to 2% |
| Water | 15 to 30% |

If an additional refractory filler, e.g. graphite is used, this is for example in an amount not exceeding 10% by weight of the composition.

EXAMPLE I

This Example is to be read with reference to the accompanying drawing which shows parts of a sliding gate valve assembly adapted for use in the casting of steel.

In the drawing a sliding gate is shown at 6 and a ladle at 9. A flexible rubber-based jointing composition embodying the invention is applied where indicated by the arrow A in the drawing to a joint between a refractory stationary plate 5 and a refractory inner nozzle 4 to provide a seal against molten steel and/or slag; the plate 5 is secured to the ladle 9 via a mounting plate 8.

| Jointing Composition (by weight) | |
|---|---|
| Alumina fines (grinding swarf - very fine) | 76.5% |
| Mineral oil (Chevron Supreme 20/50) | 5.6% |
| Butyl rubber (Lorival BR 200) | 10.2% |
| Raw linseed oil | 2.6% |
| Toluene | 3.6% |
| Xylene | 1.5% |

The ingredients were mixed in a laboratory mixer and the composition was extruded onto the stationary plate 5 away from the remainder of the gate valve assembly before the plate 5 was placed in its assembled position in the gate valve assembly. Sufficient composition was applied so that when the plate 5 was placed in its assembled position the composition was compressed and squeezed out as far as a metal casing 11 of the plate 5 and filled the joint between the plate 5 and the nozzle 4.

It was found that the composition provided an excellent highly refractory seal at the joint between the inner nozzle 4 and the plate 5. The composition adhered well to the plate 5 and had a good shelf life prior to use. Also it had excellent viscosity characteristics even when the remainder of the gate assembly was completely cold at the time of placing of the plate 5 into its assembled position, as well as when the remainder of the gate assembly was hot at the time of the application.

When the steel was cast through the nozzle 4 the components of the composition with the exception of the alumina fines all burned away leaving a compressed non-sintered layer of alumina fines which provided an excellent seal and also acted as a good parting compound between the plate 5 and the inner nozzle 4, when the plate 5 was subsequently removed from its assembled position.

It will be realised that both the plate 5 and inner nozzle 4 are relatively consumable refractory parts and are replaced at fairly frequent intervals. In placing a new nozzle 4 into assembled position, the nozzle 4 is smeared with a siliceous fireclay jointing cement and pushed into position in a well block 3, a support block 2 and an outer nozzle 1, the blocks 2 and 3 being secured in a ladle lining 10. A bottom end surface 12 of the inner nozzle 4 is ideally co-planar with an adjacent surface 13 of the outer nozzle 1 but frequently in practice this is not the case. For example in one case the nozzle 4 was not installed true to vertical and at one side the surface 12 was ¼ inch above the surface 13 and thus well spaced from the plate 5; even under these adverse conditions the jointing composition provided a good seal between the plate 5, the inner nozzle 4 and the outer nozzle 1; further the sealing was maintained under turbulent conditions obtaining during severe throttling of the steel flow by the gate valve.

In the absence of adequate sealing it will be realised that molten steel will flow between the nozzle 4, the nozzle 1 and the plate 5 causing adherence, damage to the refractories (including the outer nozzle 1) during disassembly and other adverse effects which will be apparent to those skilled in the Art.

The composition lends itself to application by unskilled personnel.

The alumina fines are of substantially the same compostion as the refractory material of the gate 6, the plate 5 and the outer nozzle 1, which composition is for example as follows by weight:

| | |
|---|---|
| $Al_2O_3$ | 86.6% |
| $SiO_2$ | 11.5% |
| Iron oxide | 0.2% |
| Lime | 0.06% |
| $M_gO$ | 0.09% |
| $Na_2O$ | 0.20% |
| $K_2O$ | 0.02% |

EXAMPLE II

Depolymerised Rubbers a. Lorival BR 200

Marketed by Lorival Limited of Bolton, England, a depolymerised butyl rubber having a nominal viscosity of 200,000 poises at 23°C.

b. Lorival R 25

A depolymerised natural rubber having a nominal viscosity of 25,000 poises at 23°C, a molecular weight of about 23,000 and a degree of polymerization of 341.

EXAMPLE III

Rubber Latex — Revinex 29Y40

Marketed by Revertex Limited of Harlow, England. A styrene/butadiene copolymer latex having the following typical properties:

| | |
|---|---|
| Total solids: | 47% |
| Water | 53% |
| Viscosity at 20°C: | 100 centipoises |

EXAMPLE IV

Non-Rubber Binders for use with Aqueous Carriers a. Cellulose Gum — Hercules 7HF

| | |
|---|---|
| Sodium carboxymethyl cellulose: | 99.5% by weight dry basis |
| Moisture content by weight: | 3.75% | b. Polysaccharide Gum — Kelzan

Marketed by Kelco Company of Clark, New Jersey, United States of America. A complex natural linear polysaccharide gum having a molecular weight of more than 1 million, commonly known as xanthan gum.

c. Refined Seaweed Extract — SeaSpen

Marketed by Marine Colloids Inc., of Springfield, N.J., U.S.A., believed to consist essentially of sodium alginate or related material.

EXAMPLE V

Refractory Powders a. Tabular Alumina T-60

Marketed by Alcoa International. A massive sintered alumina having coarse well developed tablet-like alpha alumina crystals. Particle size less than 325 mesh.
Composition by weight:

| | |
|---|---|
| $Al_2O_3$: | 99.5%+ |
| $SiO_2$: | 0.06% |
| Iron Oxide: | 0.06% |
| $Na_2O$: | 0.20% | b. Molochite DCF Sintered China Clay

Marketed by English China Clays Limited. Particle size less than 100 mesh. Composition by weight:

| | |
|---|---|
| $SiO_2$: | 55% |
| $Al_2O_3$: | 42% |
| Iron Oxide: | 0.75% |
| $TiO_2$: | 0.08% |
| CaO: | 0.1% |
| MgO: | 0.1% |
| $K_2O$: | 1.5% |
| $Na_2O$: | 0.1% | c. Fused Alumina STF

Marketed by Universal Abrasives Limited, Stafford, England. Particle size less than 100 mesh.

| | |
|---|---|
| $SiO_2$: | 1.16% |
| CaO: | 0.001% |
| $Na_2O$: | 0.81% |
| $Al_2O_3$: | 97.93% |
| Surface Iron: | 0.013% | d. Alumina Fines

As described in Example I. Particle size less than 300 mesh.

EXAMPLE VI

Jointing Composition (by weight)

| | |
|---|---|
| Alumina fines as in Example V(d): | 76.5% |
| Mineral oil (Silkolene No. 9, a largely paraffinic machine oil SAE30) | 5.27% |
| Lorival BR 200: | 10.53% |
| Raw linseed oil (British Oil and Cake Mills Limited to British Standard 243/632 1969): | 2.6% |
| Toluene | 3.6% |
| Xylene | 1.5% |

The Lorival BR 200 and mineral oil were provided as a pre-blend and then the ingredients of the composition were mixed in a laboratory mixer to yield the flexible putty-like composition. The composition was used as described in Example I to provide a seal at the joints between the inner nozzle 4 and the plate 5. Corresponding results were obtained to those described in Example I. The seal provided was highly refractory with respect to molten steel.

In a modified procedure, the composition was applied on site, when the stationary plate 5 was changed, rather than being applied to the stationary plate away from the remainder of the gate valve assembly as described in Example I. The composition was applied from a tube with a mastic gun.

The composition of this Example and the composition as described in Example I retained their flexibility in air for a considerable time, when applied to the plate 5 by the procedure described in Example I.

EXAMPLE VII

Jointing Composition (by weight)

| | |
|---|---|
| Alumina fines as in Example V(d): | 77.8% |
| Lorival R 25: | 10.4% |
| Silkolene No. 9 machine oil: | 5.7% |
| Raw Linseed oil as in Example V: | 2.6% |
| Toluene: | 2.5% |
| Xylene | 1% |

The procedure of Example VI was substantially followed and corresponding results were obtained.

EXAMPLE VIII

Jointing Composition (by weight)

| | |
|---|---|
| Alumina fines as in Example V(d): | 80% |
| Revinex 29Y40 Rubber Latex: | 20% |

The procedure of Example VI was substantially followed and corresponding results were obtained. The putty-like composition of this Example showed excellent resistance to excessive fluidity at temperatures up to 600°C; the composition does not run off a vertical refractory surface at temperatures up to 600°C. This facilitates the use of the composition when applied during a rapid ladle turnround, when the nozzle 4 is very hot. Also, the absence of volatile inflammable liquids will be noted, which minimises the hazard to personnel when the composition is applied during the rapid ladle turnround.

EXAMPLE IX

Jointing Composition (by weight)

| | |
|---|---|
| Alumina fines as in Example V(d): | 74.1% |
| Hercules 7HF cellulose gum: | 0.7% |
| Graphite powder less than 200 mesh (Austrian natural): | 3.7% |
| Water | 21.5% |

The procedure of Example VI was again substantially followed and corresponding results were obtained. The composition of this Example also has the advantages described with reference to Example VIII and again, the composition extrudes particularly well and exhibits excellent adhesion.

In a modification of this composition, glycerol is included to improve plasticity and storage properties.

I claim:

1. A putty-like composition useful in forming seals between refractory pieces exposed to high temperature, said composition consisting by weight of about 2 to 12 percent of organic liquid carrier of the group consisting of benzene, toluene, xylene solvent naphtha, white spirit, carbon tetrachloride and mixtures thereof, about 9 to 35 percent of plasticizing binder consisting of a mixture of rubber and oil, and about 60 to 90 percent of a refractory powder of a particle size finer than 100 mesh BSS, said refractory powder being selected from the group consisting of fused alumina, sintered alumina, fused mullite, sintered mullite, calcined bauxite, sintered china clay and raw kayanite and mixtures thereof, said carrier and said binder having the characteristic that they burn away when the composition is used between refractory pieces exposed to temperatures approaching the temperature of liquid steel, leaving essentially compressed non-sintered layer of refractory fines which provide both a seal between the surfaces of the pieces and a parting compound enabling the surfaces subsequently to be separated.

2. A composition according to claim 1, wherein the rubber is depolymerised butyl rubber.

3. A composition according to claim 1, wherein the rubber is depolymerised natural rubber.

4. A workpiece sealed by a composition according to claim 1.

5. A composition according to claim 1, wherein the refractory powder comprises alumina.

6. A composition as defined in claim 2 in which said powder consists of very fine alumina obtained from grinding swarf.

7. A putty-like composition useful in forming seals between refractory pieces exposed to high temperature, said composition consisting by weight of about 2 to 12 percent of a mixture of toluene and xylene as a carrier, about 9 to 35 percent of plasticizing binder consisting of a mixture of rubber and oil, and about 60 to 90 percent of a refractory powder of a particle size finer than 100 mesh BSS, said carrier and said binder having the characteristic that they burn away when the composition is used between refractory pieces exposed to temperatures approaching the temperature of liquid steel, leaving essentially a compressed non-sintered layer of refractory fines which provide both a seal between the surfaces of the pieces and a parting compound enabling the surfaces subsequently to be separated.

8. A putty-like composition useful in forming seals between refractory pieces exposed to high temperature, said composition consisting by weight of about 2 to 12 percent of organic liquid carrier of the group consisting of benzene, toluene, xylene solvent naphtha, white spirit, carbon tetrachloride and mixtures thereof, about 9 to 35 percent of plasticizing binder consisting of a mixture of rubber and oil, the oil being a mixture of mineral oil and linseed oil, and about 60 to 90 percent of a refractory powder of a particle size finer than 100 mesh BSS, said carrier and said binder having the characteristic that they burn away when the composition is used between refractory pieces exposed to temperatures approaching the temperature of liquid steel leaving essentially a compressed non-sintered layer of refractory fines which provide both a seal between the surfaces of the pieces and a parting compound enabling the surfaces subsequently to be separated.

9. A composition according to claim 8 comprising about 5 to 20 percent by weight of rubber, 3 to 10 percent of mineral oil and 1 to 5 percent of linseed oil.

* * * * *

UNITED STATES PATENT OFFICE
CERTIFICATE OF CORRECTION

Patent No. 3,904,566     Dated  Sept. 9, 1975

Inventor(s)  Joseph W. Cudby

It is certified that error appears in the above-identified patent and that said Letters Patent are hereby corrected as shown below:

Column 7, line 22, "claim 2" should read --claim 5--.

Signed and Sealed this thirteenth Day of January 1976

[SEAL]

Attest:

RUTH C. MASON
*Attesting Officer*

C. MARSHALL DANN
*Commissioner of Patents and Trademarks*